US012761692B2

(12) United States Patent
Hsu et al.

(10) Patent No.: US 12,761,692 B2
(45) Date of Patent: Oct. 13, 2026

(54) DOCKABLE EXPANSION DEVICE FOR MINICOMPUTER

(71) Applicant: VECOW CO., LTD., New Taipei City (TW)

(72) Inventors: Chia-Hsiu Hsu, New Taipei (TW); I-Feng Su, Taipei (TW); Cheng-Chu Hu, New Taipei (TW); Po-Yang Huang, Taipei (TW)

(73) Assignee: VECOW CO., LTD., New Taipei City (TW)

( * ) Notice: Subject to any disclaimer, the term of this patent is extended or adjusted under 35 U.S.C. 154(b) by 122 days.

(21) Appl. No.: 19/032,754

(22) Filed: Jan. 21, 2025

(65) Prior Publication Data

US 2025/0355465 A1 Nov. 20, 2025

Related U.S. Application Data

(60) Provisional application No. 63/647,502, filed on May 14, 2024.

(51) Int. Cl.
*G06F 1/16* (2006.01)

(52) U.S. Cl.
CPC .................................. *G06F 1/1632* (2013.01)

(58) Field of Classification Search
CPC ........ G06F 1/1632; G06F 1/185; G06F 1/186; G06F 1/20; G06F 1/203; G06F 13/4068; G06F 13/4282
See application file for complete search history.

(56) References Cited

U.S. PATENT DOCUMENTS

| | | | | |
|---|---|---|---|---|
| 6,118,663 A * | 9/2000 | Fan | G06F 1/1626 | 361/728 |
| 6,266,243 B1 * | 7/2001 | Tomioka | G06F 1/203 | 165/104.34 |
| 6,522,550 B1 * | 2/2003 | Nishio | H05K 5/30 | 361/752 |
| 9,547,620 B2 * | 1/2017 | Moore | G06F 1/1616 | |
| 10,120,422 B2 * | 11/2018 | Godfrey | G06F 1/182 | |
| 10,571,847 B2 * | 2/2020 | Miles | B65H 1/00 | |
| 2006/0285289 A1 * | 12/2006 | Jones | G06F 1/181 | 361/679.31 |

(Continued)

FOREIGN PATENT DOCUMENTS

CN 101089834 A 12/2007

*Primary Examiner* — Abhishek M Rathod
(74) *Attorney, Agent, or Firm* — ScienBiziP, P.C.

(57) ABSTRACT

A dockable expansion device for a minicomputer is provided. The minicomputer includes a thermal module, a motherboard, and a first connector. The thermal module is positioned on one side of the motherboard, and the first connector is mounted on another side of the motherboard opposite the thermal module. The dockable expansion device includes a casing and a Mobile PCI Express Module (MXM) expansion board. The MXM expansion board includes a slot for connecting an MXM graphics module, and a second connector. The second connector is compatible with the first connector and installed facing an opening of the casing. The first connector is exposed from a bottom surface of the minicomputer, and the second connector is configured to align with the first connector when the minicomputer is docked with the dockable expansion device.

7 Claims, 6 Drawing Sheets

(56) References Cited

U.S. PATENT DOCUMENTS

| | | | | |
|---|---|---|---|---|
| 2008/0259556 | A1* | 10/2008 | Tracy | G06F 1/1632 361/679.49 |
| 2009/0043936 | A1* | 2/2009 | Yang | G06F 1/1632 710/304 |
| 2015/0356051 | A1* | 12/2015 | Benson | G06F 1/16 710/313 |
| 2022/0269320 | A1* | 8/2022 | Chien | H05K 5/0073 |

* cited by examiner

DOCKABLE EXPANSION DEVICE FOR MINICOMPUTER

FIELD

The present disclosure generally relates to computer hardware expansion technology and, more particularly, to a dockable expansion device for minicomputers.

BACKGROUND

Minicomputers are compact personal computers widely used in space-constrained environments due to their small form factor, low power consumption, and portability. Prominent examples of minicomputers include Intel® Next Unit of Computing (NUC) series, and similar minicomputers are produced by various manufacturers following similar dimensional standards. Typically, minicomputers measure to approximately 4×4 inches in size. However, due to their limited physical dimensions, minicomputers face significant challenges in hardware expandability. The internal space is insufficient to accommodate standard-sized expansion cards, thereby limiting the potential for performance enhancement. Consequently, the system configuration of minicomputers is often fixed at the time of manufacture, leaving users with little flexibility to upgrade their systems based on personal requirements.

In contrast, traditional desktop computers feature ample internal space, allowing users to enhance performance through the installation of expansion cards. Such expansion cards include graphics cards that improve graphical processing capabilities and enable artificial intelligence (AI) computations.

Currently, the market offers two primary types of graphic expansion cards: blower-style cards and Mobile PCI Express Module (MXM) cards. Due to its compact form factor, the MXM standard is commonly employed in laptop computers. However, complex installation and stringent cooling requirements make replacements and upgrades of the MXM graphics cards in both laptops and minicomputers difficult for users.

In light of the above, there is a need to address the limitations in hardware expandability of existing minicomputers. A solution that provides greater flexibility for applications, such as graphical processing and AI computations, is required to overcome these challenges effectively.

SUMMARY

In view of the above, the present disclosure provides a dockable expansion device for a minicomputer, enabling users to easily enhance the computational capabilities of the minicomputer according to their specific needs.

The present disclosure provides a dockable expansion device for a minicomputer. The minicomputer includes a first thermal module, a motherboard, and a first connector, the first thermal module is disposed on a side of the motherboard, and the first connector is disposed on another side of the motherboard opposite the first thermal module. The dockable expansion device includes a housing having an opening and a Mobile PCI Express Module (MXM) expansion board. The MXM expansion board includes a slot configured to connect to an MXM graphics module, and a second connector compatible with the first connector and disposed facing the opening. The first connector is exposed from a bottom surface of the minicomputer, and the second connector is configured to align with the first connector when the minicomputer is docked with the dockable expansion device.

In an implementation of the present disclosure, the slot is disposed on a side of the MXM expansion board away from the opening.

In another implementation of the present disclosure, the housing includes a containing space which is located on the side of the MXM expansion board away from the opening.

In yet another implementation of the present disclosure, the housing has dimensions equal to or greater than 117 mm×112 mm×50 mm.

In yet another implementation of the first aspect, the containing space has dimensions equal to or greater than 102 mm×90 mm×35 mm.

In yet another implementation of the present disclosure, the dockable expansion device further includes a second thermal module, which is disposed within the containing space and configured to dissipate heat from the MXM graphics module.

In yet another implementation of the present disclosure, the first connector includes a high-speed signal female connector, the second connector includes a high-speed signal male connector, and the second connector protrudes through the opening from a top surface of the dockable expansion device by a first height.

In yet another implementation of the present disclosure, the dockable expansion device further includes a male alignment element which is protruding in a facing direction of the opening from the top surface by a second height. The second height is greater than the first height.

DETAILED DESCRIPTION

Figure 1:
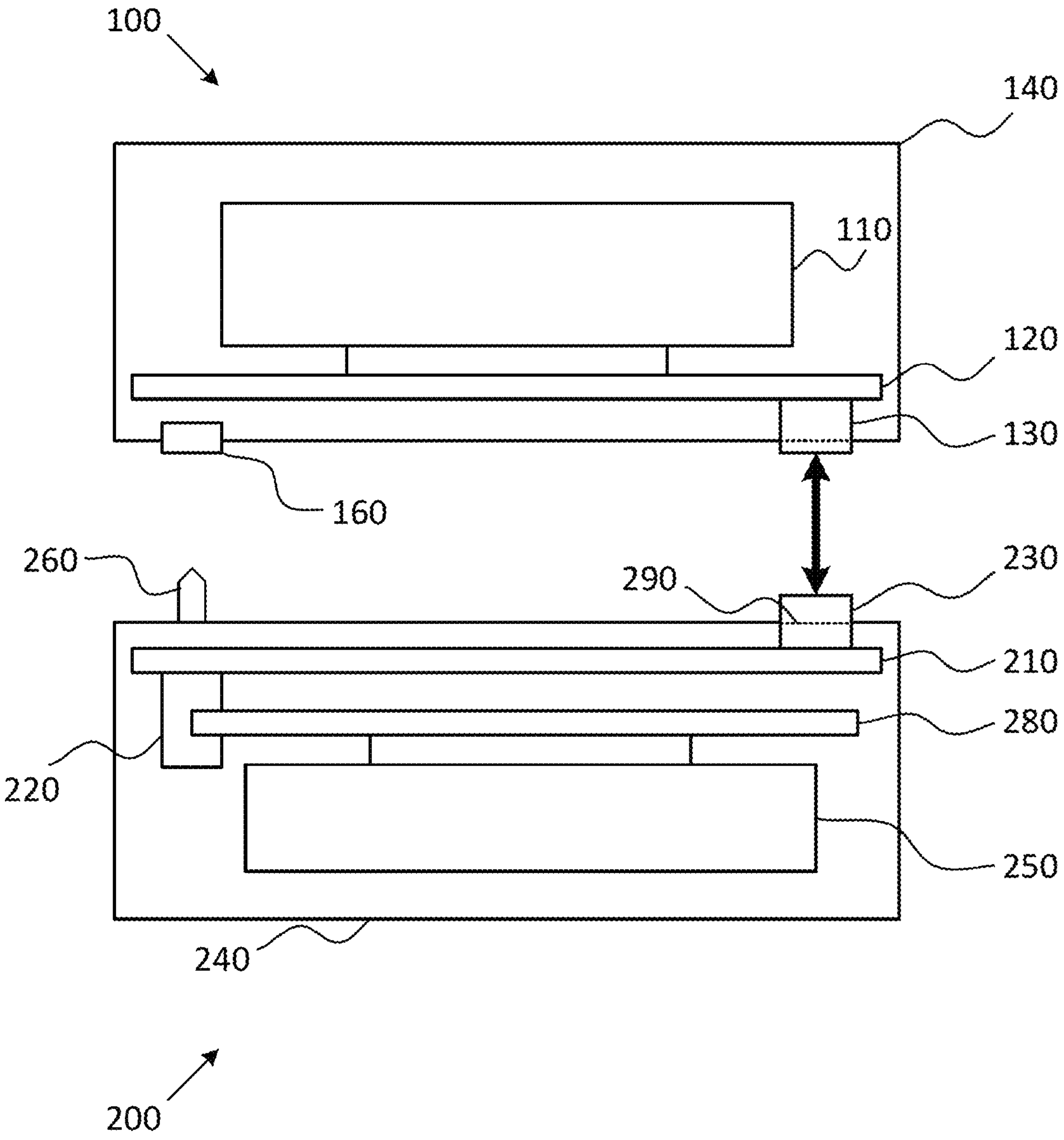
FIG. 1 is a diagram illustrating a dockable expansion device for a minicomputer in accordance with an example implementation of the present disclosure.

The following description includes specific information regarding the exemplary implementations of the present disclosure. The accompanying detailed description and drawings of the present disclosure are intended to illustrate the exemplary implementations only. However, the present disclosure is not limited to these exemplary implementations. Those skilled in the art will appreciate that various modifications and alternative implementations of the present disclosure are possible. In addition, the drawings and examples in the present disclosure are generally not drawn to scale and do not correspond to actual relative sizes.

For consistency and ease of understanding, the exemplary drawings use reference numerals to denote identical features (although this is not done in some examples). However, features in different exemplary implementations may differ in other respects and should not be narrowly construed based solely on the features shown in the drawings.

Terms such as "at least one implementation," "an implementation," "multiple implementations," "different implementations," "some implementations," and "this implementation" indicate that the described implementations of the present disclosure may include specific features, structures, or characteristics, but not every possible implementation of the present disclosure must include those specific features, structures, or characteristics. Furthermore, repeated use of the phrases "in one implementation" or "in this implementation" does not necessarily refer to the same implementation, although they may overlap. Additionally, phrases such as "implementations" in connection with "the present disclosure" do not imply that every implementation of the present disclosure must include the specific features, structures, or characteristics described, but should be understood as meaning "at least some implementations of the present disclosure" include the described features, structures, or characteristics. The term "coupled" is defined as connected, either directly or indirectly through intermediate components, and does not necessarily require physical attachment. When the term "comprises" is used, it means "includes, but is not limited to," explicitly signifying an open inclusion or relationship of the described combination, group, series, or equivalents.

Furthermore, details, such as functional entities, technologies, protocols, or standards, are described for the purpose of explanation and not limitation, to aid in understanding the described technology. In other examples, detailed descriptions of well-known methods, techniques, systems, or architectures are omitted to prevent unnecessary confusion with excessive detail in the specification.

The terms "first," "second," and "third," among others, used in the specification and the drawings, are for distinguishing different objects rather than describing a particular sequence. Additionally, the term "comprises," along with any of its variations, is intended to cover non-exclusive inclusion. For instance, a process, method, system, product, or device that comprises a series of steps or modules is not limited to those listed steps or modules but may optionally include additional steps or modules not listed, or optionally include other inherent steps or modules for such processes, methods, products, or devices.

Figure 2:
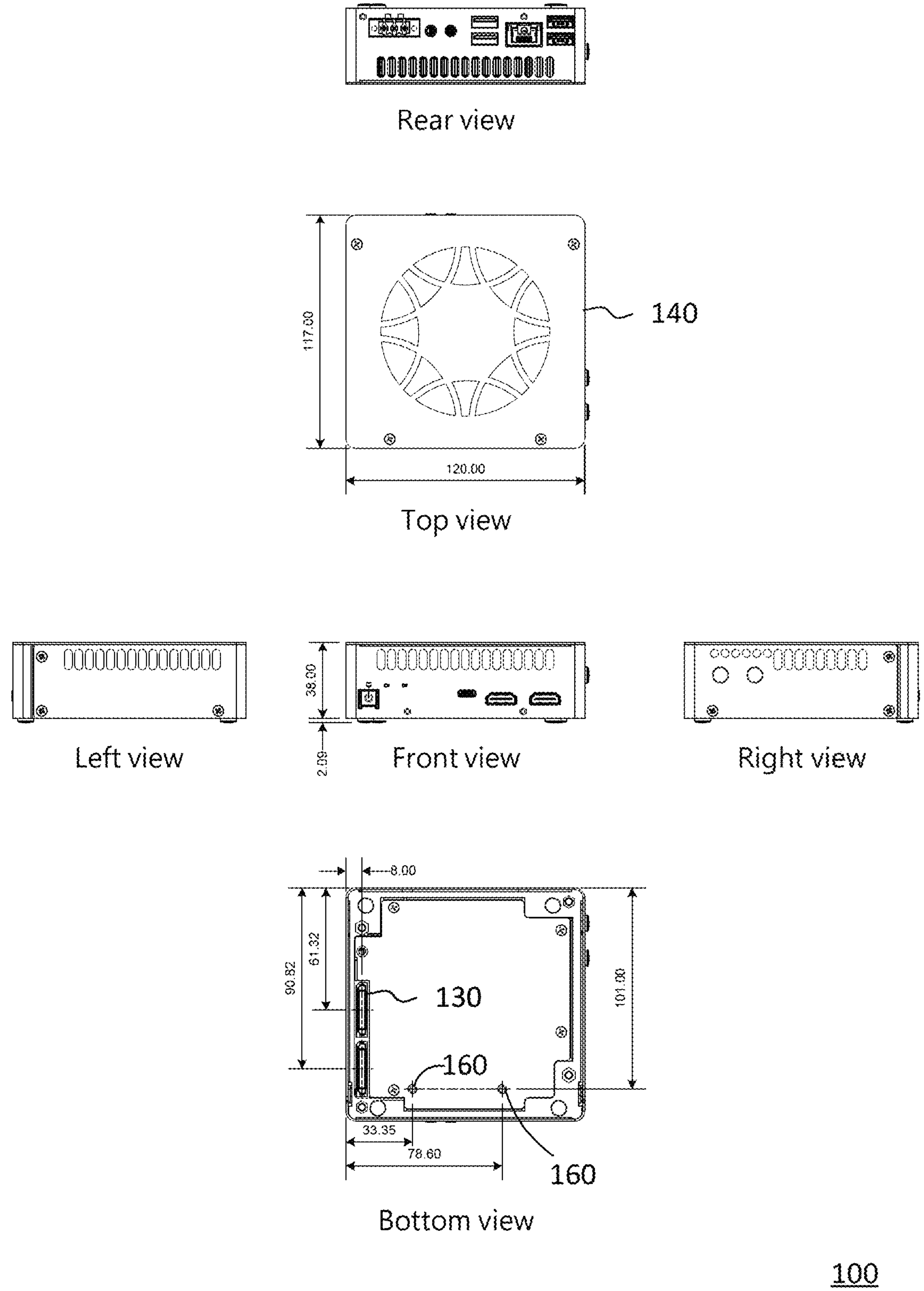
FIG. 2 is a diagram illustrating six views of a minicomputer in accordance with an example implementation of the present disclosure.
Figure 3:
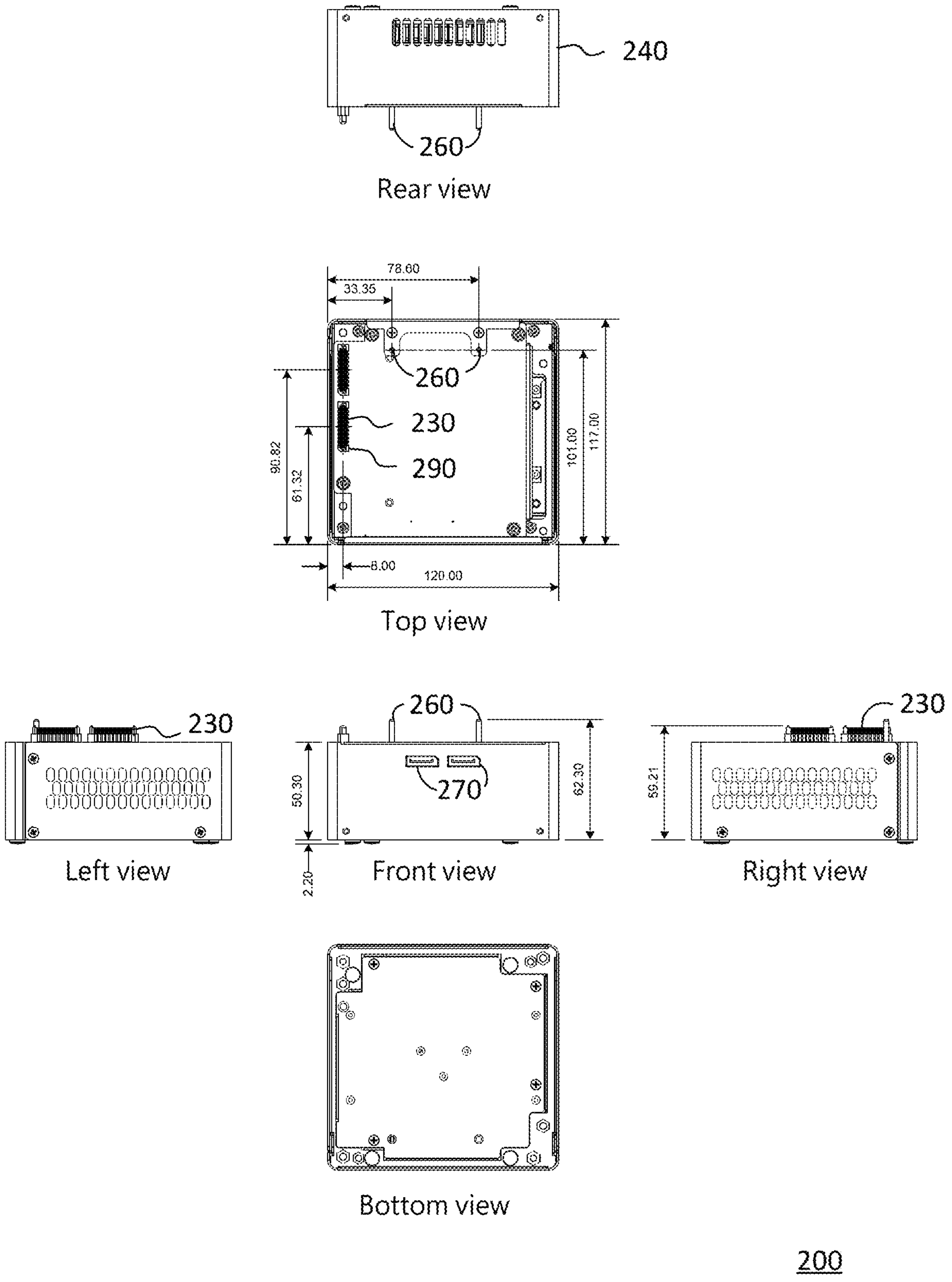
FIG. 3 is a diagram illustrating six views of a dockable expansion device in accordance with an example implementation of the present disclosure.

FIG. 1 is a diagram illustrating a dockable expansion device for a minicomputer in accordance with an example implementation of the present disclosure. FIG. 2 is a diagram illustrating six views of a minicomputer in accordance with an example implementation of the present disclosure. FIG. 3 is a diagram illustrating six views of a dockable expansion device in accordance with an example implementation of the present disclosure.

Referring to FIGS. 1 and 2, a minicomputer 100 may include a thermal module 110, a motherboard 120, and a connector 130 (e.g., a first connector). The connector 130 may be disposed on a side of the motherboard 120 that is opposite to another side of the motherboard 120 on which the thermal module 110 is disposed. Taking the perspective of FIG. 1 as an example, the thermal module 110 may be positioned on an upper surface side of the motherboard 120, while the connector 130 is mounted on the motherboard 120. As shown in FIGS. 1 and 2, the connector 130 may face a lower surface side of the motherboard 120 and be exposed from the bottom surface of the minicomputer 100. For example, the connector 130 on the motherboard 120 may be used for coupling (e.g., directly or indirectly connecting) an expansion card, such as a Mobile PCI Express Module (MXM) graphics module, that enhances the computational capability of the minicomputer 100.

In some implementations, the minicomputer 100 may further include multiple electronic components, such as a processor and memory, which may be disposed on the same side as the thermal module 110 on the motherboard 120. In some implementations, the thermal module 110 may, for example, be a fan module.

In some implementations, multiple electronic components of the minicomputer 100 (e.g., including the thermal module 110, the motherboard 120, and the connector 130) may all be disposed within a housing 140 of the minicomputer 100.

In some implementations, the minicomputer 100 may include a Video Electronics Standards Association (VESA) mounting interface for securing the minicomputer 100 to a display device, such as a monitor (e.g., on its rear side).

In some implementations, the minicomputer 100 may also be referred to as a mini personal computer (Mini PC).

Referring to FIGS. 1 and 3, a dockable expansion device 200 may include an MXM expansion board 210 and a housing 240 configured to accommodate the components of the dockable expansion device 200. From the perspective of FIG. 1, as shown in FIG. 3, the housing 240 may have an upward-facing opening 290, and the MXM expansion board 210 may include a connector 230 (e.g., a second connector) positioned corresponding to the opening 290 of the housing 240, allowing the connector 230 to be exposed from the top surface of the dockable expansion device 200. For example, the connector 230 may be located on the upper surface of the MXM expansion board 210. On the other hand, the lower surface of the MXM expansion board 210 may be equipped with a slot 220 for connecting an MXM graphics module 280, such as an MXM graphics card.

In some implementations, the housing 240 of the dockable expansion device 200 may further include a thermal module 250 disposed on the lower surface side of the MXM expansion board 210, for dissipating heat from the MXM graphics module 280. In other words, the opening 290 of the housing 240 may be located on one side of the MXM expansion board 210, while the slot 220 and the thermal module 250 may be located on another side of the MXM expansion board 210 opposite the opening 290. In some implementations, the thermal module 250 may, for example, be a fan module. In some implementations, the side surface of the housing 240 of the dockable expansion device 200 may include at least one side opening 270. The side opening 270 may be positioned corresponding to the output ports of the MXM graphics module 280.

In some implementations, the dockable expansion device 200 may include a VESA mounting interface for securely attaching both the minicomputer 100 and the dockable expansion device 200 to a display device, such as a monitor (e.g., on its rear side). For example, both the MXM expansion board 210 and the housing 240 may include VESA mounting interfaces, allowing the bottom surface of the dockable expansion device 200 to be secured to the rear of the display device, while the bottom surface of the minicomputer 100 may be secured to the top surface of the dockable expansion device 200.

Referring to FIGS. 1, 2, and 3, the bottom surface of the minicomputer 100 may dock with the top surface of the dockable expansion device 200, such that during docking, the connector 130 of the minicomputer 100 aligns with the connector 230 of the dockable expansion device 200. The connectors 130 and 230 may, for example, be compatible with each other.

In some implementations, the connector 130 of the minicomputer 100 and the connector 230 of the dockable expansion device 200 may be complementary connectors of the same specification. For example, the connector 130 may be a high-speed signal female connector, while the connector 230 may be a high-speed signal male connector. In some implementations, as shown in FIG. 2 and FIG. 3, the bottom surface of the minicomputer 100 may include a recessed or female alignment element 160, and the top surface of the dockable expansion device 200 may include a protruding or male alignment element 260. The height of the (male) alignment element 260 protruding from the top surface of the dockable expansion device 200 may exceed the height of the connector 230 protruding from the same surface, which is a design that enhances the smoothness of the docking process.

In some implementations, when a user requires expansion of the minicomputer 100, the dockable expansion device 200 with an MXM graphics module 280 installed may be docked with the minicomputer 100. The docking effectively installs the MXM graphics module 280 onto the motherboard 120 of the minicomputer 100, thereby enhancing the computational capability of the minicomputer 100.

In some implementations, the bottom surface of the minicomputer 100 and the top surface of the dockable expansion device 200 may have the same dimensions.

In some implementations, to accommodate the thermal module 250, the housing 240 may be designed to include a containing space of a specific minimum size. The containing space may be reserved for the thermal module 250. In other words, the designated containing space in the housing 240 may be located on the side of the MXM expansion board 210 opposite the opening 290 of the housing 240, or the connector 230, and the containing space may include no structures other than the thermal module 250. In some implementations, the housing 240 may include heat dissipation windows (e.g., on the side and/or bottom surfaces of the housing 240) corresponding to the location of the containing space.

In some implementations, the dimensions of the housing 240 may be greater than or equal to 117 mm×112 mm×50 mm. Specifically, the length of the housing 240 may be greater than or equal to 117 mm; the width of the housing 240 may be greater than or equal to 112 mm; and the height of the housing 240 may be greater than or equal to 50 mm.

In some implementations, as shown in FIG. 3, the dimensions of the housing 240 may be approximately 120 mm×117 mm×50 mm. For example, the length of the housing 240 may be approximately 120 mm; the width of the housing 240 may be approximately 112 mm; and the height of the housing 240 may be approximately 50 mm.

In some implementations, the dimensions of the containing space inside the housing 240 may be greater than or equal to 102 mm×90 mm×35 mm. Specifically, the length of the containing space inside the housing 240 may be greater than or equal to 102 mm; the width of the containing space inside the housing 240 may be greater than or equal to 90 mm; and the height of the containing space inside the housing 240 may be greater than or equal to 35 mm.

Figure 4A:
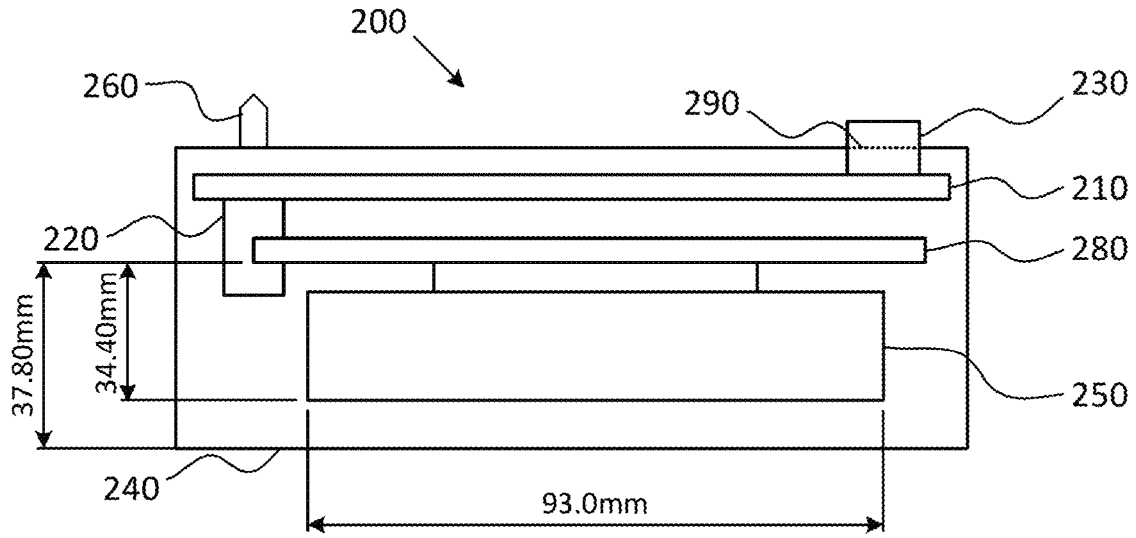
FIG. 4A is a diagram illustrating a lateral view of a containing space in accordance with an example implementation of the present disclosure.
Figure 4B:
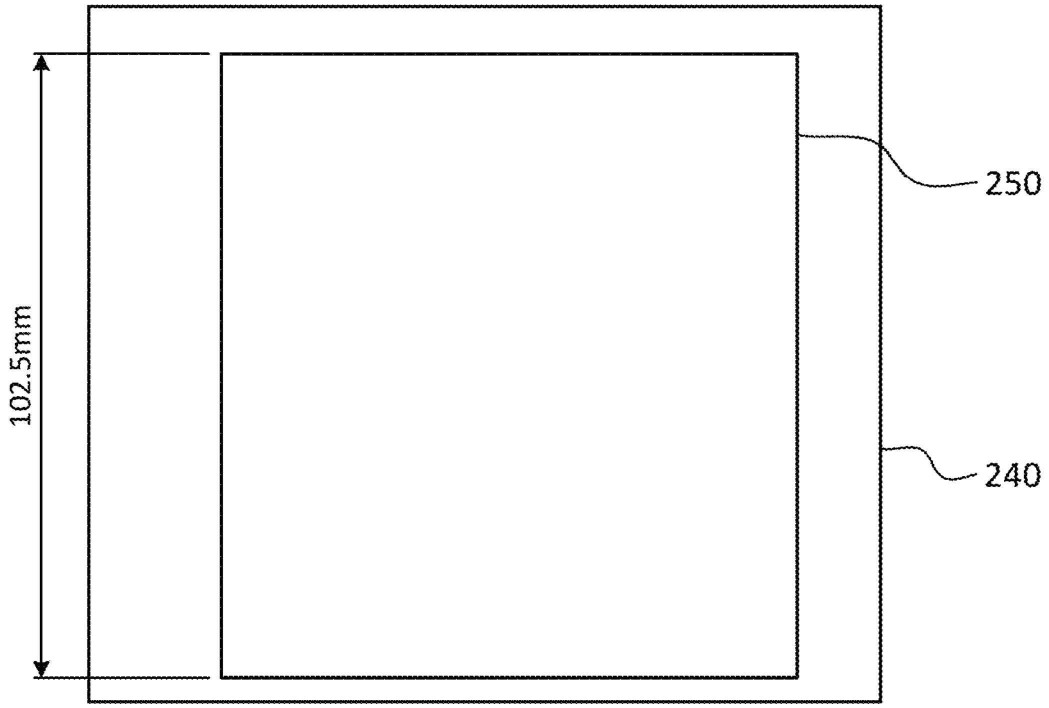
FIG. 4B is a diagram illustrating a top view of the containing space in accordance with an example implementation of the present disclosure.

FIG. 4A is a diagram illustrating a lateral view of the containing space in accordance with an example implementation of the present disclosure. FIG. 4B is a diagram illustrating a top view of the containing space in accordance with an example implementation of the present disclosure. FIG. 4A illustrates an example with the same perspective as FIG. 1.

Referring to FIG. 4A and FIG. 4B, in some implementations, the housing 240 may include an MXM expansion board 210, and the MXM graphics module 280 may, for example, be inserted into the slot 220 of the MXM expansion board 210. The containing space within the housing 240 may be designed to be located beneath the MXM graphics module 280 and may have dimensions of approximately 102.5 mm×93 mm×37.8 mm.

Advantageously, designing the positions of the MXM expansion board 210 and the MXM graphics module 280 within the housing 240 and reserving a containing space of a specific minimum size relative to the positions may ensure that the thermal module 250 is placed within the containing space corresponding to the MXM graphics module 280, which is a configuration that enables effective heat dissipation for the MXM graphics module 280.

More specifically, proper heat dissipation is necessary due to the high computational capability of the MXM graphics module 280. Additionally, the processing unit location or the area with the highest heat dissipation requirements may differ among various brands or models of MXM graphics modules 280. Designing the containing space within the housing 240 to accommodate multiple configurations of MXM graphics modules 280 allows the dockable expansion module 200 to support a broader range of MXM graphics modules 280, which is a design that also ensures every MXM graphics module 280 achieving effective cooling for optimal operational performance.

It should be noted that the dimensions shown in FIG. 2, FIG. 3, FIG. 4A, and FIG. 4B are measured in millimeters and are provided solely for illustrative purposes without imposing limitations on the disclosure.

Figure 5:
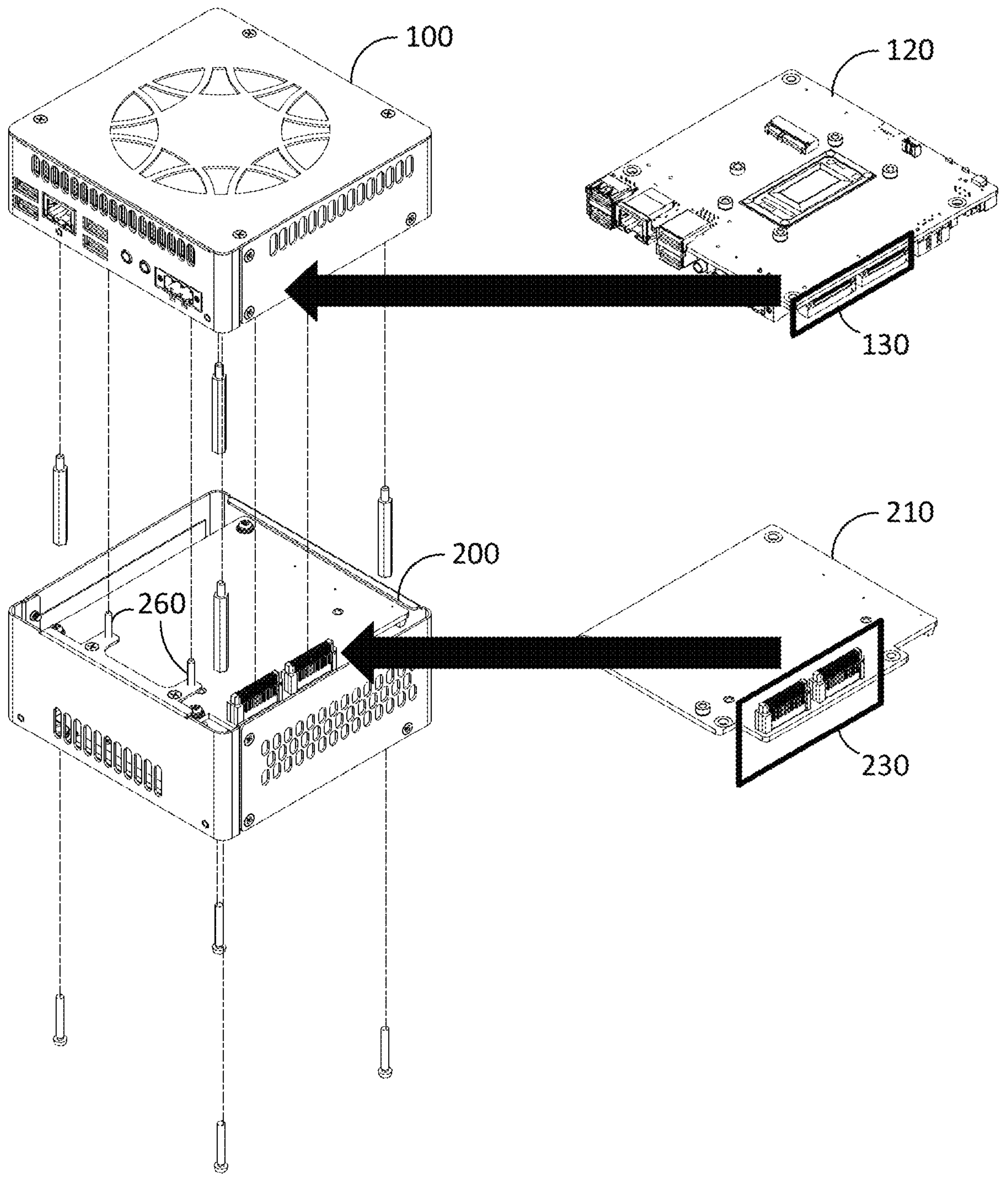
FIG. 5 is a diagram illustrating a docking process between a minicomputer and a dockable expansion device in accordance with an example implementation of the present disclosure.

FIG. 5 is a diagram illustrating a docking process between a minicomputer 100 and a dockable expansion device 200 in accordance with an example implementation of the present disclosure. It should be noted that FIG. 5 illustrates, on the left, a perspective view of the docking process between the minicomputer 100 and the dockable expansion device 200. However, to clearly depict the components involved in the docking process, the right side of FIG. 5 only shows the motherboard 120 of the minicomputer 100 and the MXM expansion board 210 of the dockable expansion device 200.

Referring to FIG. 5, the bottom surface of the minicomputer 100 may dock with the top surface of the dockable expansion device 200. During docking, the connector 130 of the minicomputer 100 may be exposed from the housing 140 and aligned with the connector 230 of the dockable expansion device 200. Additionally, the alignment element 260 on the top surface of the dockable expansion device 200 may also align with the alignment element 160 on the bottom surface of the minicomputer 100 (not shown in FIG. 5), serving as a guide during docking.

It is worth mentioning that, due to size constraints, the minicomputer 100 may have additional expansion needs beyond computational capability, such as requirements for additional ports. Therefore, the dockable expansion device 200 may directly dock with the minicomputer 100 as shown in FIG. 5, or alternatively, may indirectly connect to the minicomputer 100 through docking with other expansion modules.

Figure 6:
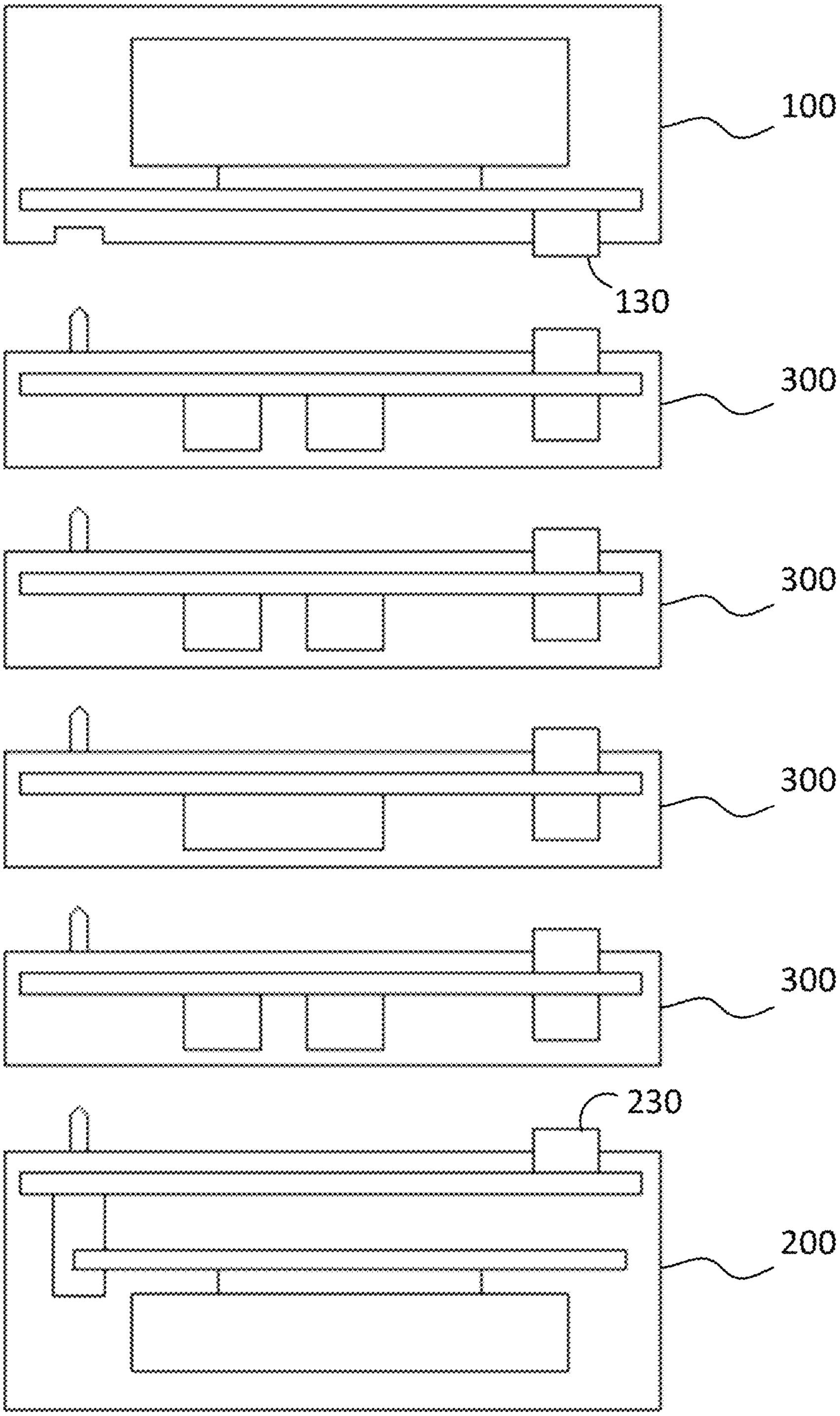
FIG. 6 is a diagram illustrating an expansion process of a minicomputer, using a dockable expansion device and at least one expansion module, in accordance with an example implementation of the present disclosure.

FIG. 6 is a diagram illustrating an expansion process of a minicomputer 100, using a dockable expansion device 200 and at least one expansion module 300, in accordance with an example implementation of the present disclosure.

Referring to FIG. 6, in some implementations, the minicomputer 100 may first connect in series with at least one expansion module 300, and subsequently connect to the dockable expansion device 200. For example, the at least one expansion module 300 may include one or more of the following modules or a combination thereof: Universal Serial Bus (USB) port expansion module, serial (COM) port expansion module, digital input/output (DIO) port expansion module, and local area network (LAN) port expansion module.

In some implementations, an expansion module 300 may include a module expansion board of corresponding ports, and a housing. Both top and bottom surfaces of the housing may include openings. The module expansion board may be equipped with two connectors facing toward the top and bottom surfaces of the housing. One connector (e.g., a male connector) may be exposed from the top surface of the expansion module 300, while another connector (e.g., a female connector) may be exposed from the bottom surface of the expansion module 300.

In some implementations, the side surfaces of the housing of the expansion module 300 may include at least one opening. The position of the at least one opening may correspond to the ports on the module expansion board, such as USB, COM, DIO, or LAN ports.

Referring to FIG. 6, the bottom surface of the minicomputer 100 may dock with the top surface of an expansion module 300. During docking, the connector 130 of the minicomputer 100 may align with and match the connector exposed on the top surface of the expansion module 300. On the other hand, the bottom surface of the expansion module 300 may dock with the top surface of another expansion module 300. During docking, the connector exposed on the bottom surface of the expansion module 300 may align with and match the connector exposed on the top surface of the other expansion module 300. Furthermore, the top surface of the dockable expansion device 200 may dock with the bottom surface of an expansion module 300, and during docking, the connector 230 of the dockable expansion device 200 may align with and match the connector exposed on the bottom surface of the expansion module 300.

In some implementations, the connector 130 of the minicomputer 100 may be a complementary connector of the same specification with the connector 230 of the dockable expansion device 200 and the connector exposed on the top surface of the expansion module 300. Additionally, the two connectors exposed on the top and bottom surfaces of the expansion module 300 may also be complementary connectors of the same specification. For example, the connector 130 and the connector exposed on the bottom surface of the expansion module 300 may be high-speed signal female connectors, while the connector 230 and the connector exposed on the top surface of the expansion module 300 may be high-speed signal male connectors.

Through the above-mentioned arrangement, the minicomputer 100, at least one expansion module 300, and the dockable expansion device 200 may stack and dock with one another in a layered configuration, functioning collectively to achieve the goal of expanding the minicomputer 100 based on user requirements.

In summary, the dockable expansion device for the minicomputer provided in the implementations of the present disclosure allows users to easily expand the computational capability of the minicomputer as needed through a designed expansion board and connector arrangement. Particularly, for MXM graphics modules with high computational capabilities and corresponding heat dissipation requirements, the implementations of the present disclosure reserve sufficient containing space in the dockable expansion device to accommodate thermal modules, such as fans, enabling effective cooling of the MXM graphics module at the corresponding location.

Based on the above description, it is apparent that various techniques can be configured to implement the concepts described in this application without departing from their scope. Furthermore, although certain implementations have been specifically described and illustrated, those skilled in the art will recognize that variations and modifications can be made in form and detail without departing from the scope of the concepts. Thus, the described implementations are to be considered in all respects as illustrative and not restrictive. Moreover, it should be understood that this application is not limited to the specific implementations described above, but many rearrangements, modifications, and substitutions can be made within the scope of the present disclosure.

What is claimed is:

1. A dockable expansion device for a minicomputer, the minicomputer comprising a first thermal module, a motherboard, and a first connector, the first thermal module being disposed on a side of the motherboard, and the first connector being disposed on another side of the motherboard opposite the first thermal module, the dockable expansion device comprising:
- a housing having an opening; and
- a Mobile PCI Express Module (MXM) expansion board, comprising:
  - a slot configured to connect to an MXM graphics module, the slot being located on the opposite side of the MXM expansion board relative to the opening, the MXM graphic module being stacked on the opposite side of the MXM expansion board relative to the opening and substantially parallel to the MXM expansion board; and
  - a second connector compatible with the first connector and disposed facing the opening,
- wherein the first connector is exposed from a bottom surface of the minicomputer, and the second connector is configured to align with the first connector when the minicomputer is docked with the dockable expansion device.

2. The dockable expansion device of claim 1, wherein the housing comprises:
- a containing space located on the side of the MXM expansion board away from the opening.

3. The dockable expansion device of claim 2, wherein the housing has dimensions equal to or greater than 117 mm×112 mm×50 mm.

4. The dockable expansion device of claim 3, wherein the containing space has dimensions equal to or greater than 102 mm×90 mm×35 mm.

5. The dockable expansion device of claim 2, further comprising:
- a second thermal module disposed within the containing space and configured to dissipate heat from the MXM graphics module.

6. The dockable expansion device of claim 1, wherein the first connector comprises a high-speed signal female connector, the second connector comprises a high-speed signal male connector, and the second connector protrudes through the opening from a top surface of the dockable expansion device by a first height.

7. The dockable expansion device of claim 6, further comprising:

a male alignment element protruding in a facing direction of the opening from the top surface by a second height, wherein the second height is greater than the first height.

* * * * *